UNITED STATES PATENT OFFICE.

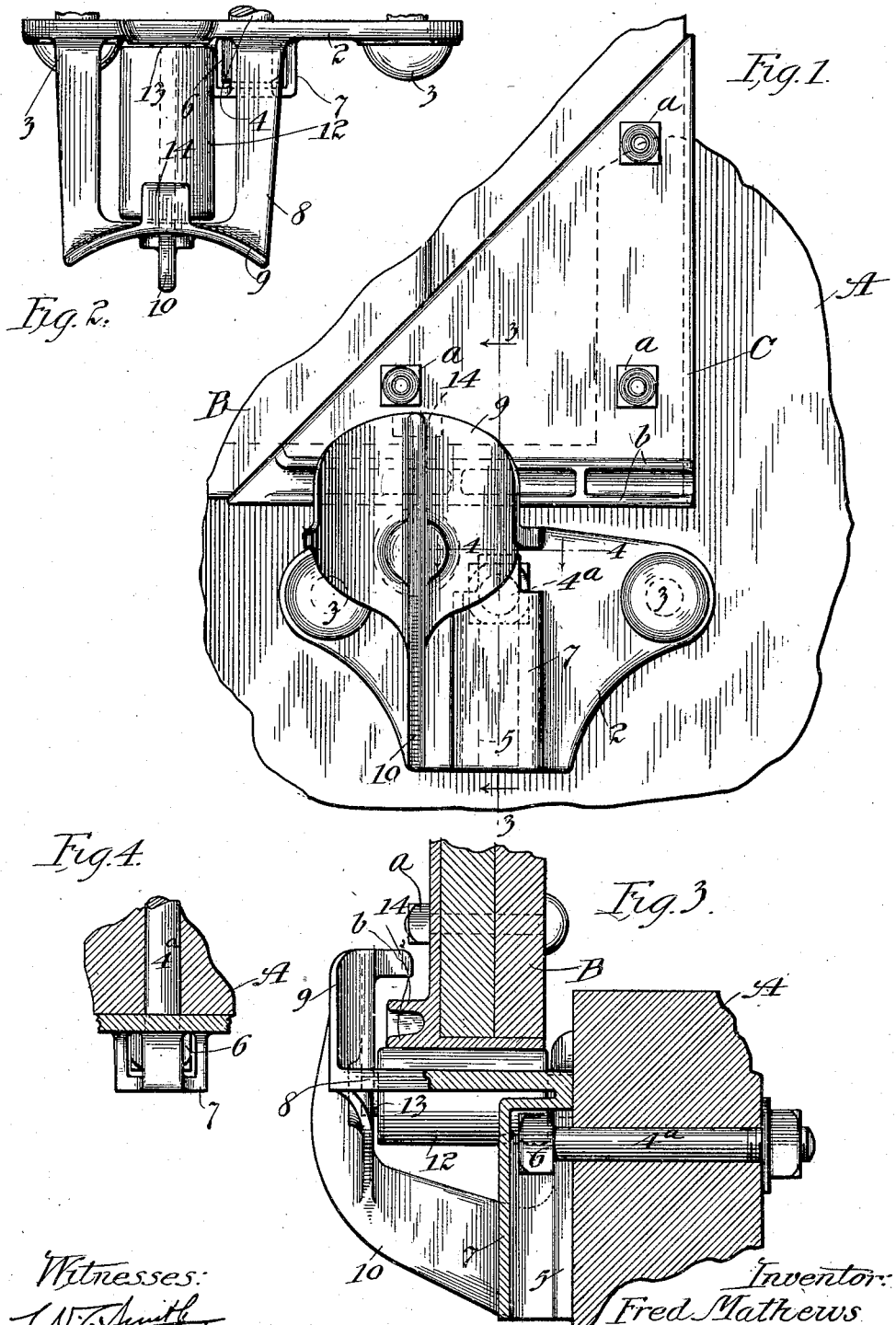

FRED MATHEWS, OF CHICAGO, ILLINOIS, ASSIGNOR TO CLINTON C. MURPHY, OF CHICAGO, ILLINOIS.

SUPPORTING-BRACKET FOR CAR-DOORS.

1,149,667.  Specification of Letters Patent.  Patented Aug. 10, 1915.

Application filed February 19, 1915. Serial No. 9,353.

*To all whom it may concern:*

Be it known that I, FRED MATHEWS, a citizen of the United States, residing at Chicago, in the county of Cook and State of Illinois, have invented new and useful Improvements in Supporting - Brackets for Car-Doors, of which the following is a full, clear, and exact description.

My invention relates to brackets for supporting and directing the movements of freight car doors.

Heretofore considerable property has been stolen from freight cars by dishonest employes and others, who, in view of the trust reposed in them, do not dare to break the seal used in connection with the door lock for fear of detection, but resort to prying by means of any suitable instrumentality the lower edge of the door up over the guard of the bracket that is designed to keep the same against the side of the car. Or the entire bracket is torn from its movings by manipulating the bolts and prying the attaching plate outward and then replacing it with dummy bolts or other means which escape notice until jolted out by the vibration of the car after it has left the place where the theft was committed, thus making it almost impossible to trace the plunderer.

The object of my invention is to combine in one structure a bracket that will prevent the car door from being pried upward off the same and will render it impossible to tamper with all of the bolts or rivets employed to secure said bracket in position, and thus make it very much more difficult to pry the bracket from the side of the car. This I accomplish by the means hereinafter fully described, and as particularly pointed out in the claims.

In the drawings, Figure 1 is a side view of a fragment of the side of a freight car and of a lower corner portion of a car door and supporting bracket therefor embodying my invention. Fig. 2 is a plan view of said bracket removed from the said car. Fig. 3 is a vertical transverse section of the same taken on dotted line 3—3, Fig. 1. Fig. 4 is a detail view showing a horizontal section of said bracket just above the central bolt head housing.

Referring to the drawings, A represents a fragment of the side of a freight car, and B represents the lower right hand corner portion of a car-door. This corner of the car-door has a triangular corner-plate C, which is secured to the door by means of bolts $a, a, a$, and which has its right angular edges flanged rearwardly to protect the edges of the corner of the car-door from mutilation, and is provided with parallel horizontal ribs, $b, b$, adjacent to and parallel with its lower edge. These ribs extend practically the entire length of the lower edge of the plate and the outer edges near their ends are beveled or slanted toward the ends thereof so that when the door is slid back and forth the slanting edges of the ends of said ribs will come in contact with the inner surface of the guide-plate of the brackets and will cause the lower edge of the door to move toward the side of the car. These brackets each comprises an attaching-plate 2 the upper portion of which is, preferably, wider than the lower and is secured to the side of the car by means of rivets or bolts 3, 3, that pass through bolt holes (not shown) in the resulting lobes at each end and by means of a bolt $4^a$ about midway between bolts 3. The attaching-plate is provided with a vertically elongated slot 5 midway between bolts 3, 3, which extends from the lower edge of said plate to a point above the horizontal plane of bolts 3. The barrel of bolt $4^a$ passes through said slot 5, but the shoulders of head 6 of the bolt bear against the outer margins of the edges of the same, and said head is inclosed within a vertically elongated housing 7 which is integral with the attaching-plate, and is built out in front of slot 5 and extends from the lower edge of said plate to a point above said slot. This housing is rectangular in horizontal section and the width of its bore is but slightly greater than the width of the head of bolt $4^a$, and its upper end has its angles cut away for convenience in casting it. When attaching the brackets to the sides of the car, bolt $4^a$ is first loosely passed through its previously made bolt hole, and the attaching-plate placed in proper position above said bolt against the side of the car, and then moved vertically downward so that the head of bolt $4^a$ enters the lower open end of the housing and the barrel of the bolt enters slot 5. When the bolt reaches the position, shown in Fig. 3 of the drawings, holes are bored through the side walls of the car, and bolts 3—3 are inserted and then all of them tightened.

The construction of the attaching-plate with slot 5 in it permits of the vertical adjustment of plate 2 to enable it to support the lower edge of the car-door before bolts 3 are inserted and tightened, and thus insures an even support for the door from one end to the other.

The bracket proper consists of a platform 8 which is made integral with and projects out from the upper edge of the attaching-plate above the upper end of the housing, and in such relative position that said housing is under one side edge thereof and the outer edge of this platform has a guide or confining wall 9 projecting vertically therefrom. The lower edge of the car-door moves between this guide-wall and the side of the car, and I prefer to convex the side of it facing the car so as to prevent the vertical edges of the moving door striking its vertical edges. The outer edge of this guide-plate is braced and supported by a strut 10, the lower end of which is sprung from the lower part of the attaching-plate alongside of the housing and which extends outward and upward to and merges into the platform and guide-wall and, preferably, extends as a central rib in front of the guide-wall.

The central portion of platform 8 is cut away between guide-wall 9 and the attaching-plate, and in the substantially retangular space so provided a roller 12 is placed with the axis of the same at right angles to the lower edge of the door. This roller is journaled on a spindle 13 and the latter has bearings in guide-wall 9 and an extension thereof below the plane of platform 8, and in the attaching-plate and the lower edge of the door rests on this roller.

The center of the guide-wall, just below its upper edge, is provided with a lug 14 that projects inward toward the door, and over ribs *b*, *b*, of the corner-plate C and when the door and the bracket are properly assembled this lug will be above ribs *b* about one-half an inch and will positively prevent the door being raised more than that distance by reason of the ribs coming in contact therewith.

While I much prefer the use of the roller 12, it can be dispensed with and the door can rest directly on the platform. In such event, the lug 14 could be placed lower down on the guide-wall. I do not wish to be confined to the exact proportions of the various parts of my improved bracket, as illustrated, as these may be changed and the exact construction, as hereinbefore described, may be altered without departing from the spirit of my invention.

What I claim as new is:

1. A support for car doors comprising an attaching-plate having a vertical slot in the lower edge thereof, a vertically elongated tubular housing projecting therefrom in front of said slot, a platform projecting from said plate above said housing, a guide-wall rising from the outer edges of said platform, and a lug projecting from said guide-wall in combination with a car door and a horizontal rib projecting therefrom which is adapted to be engaged by said lug.

2. A support for car-doors comprising an attaching-plate, a platform projecting from said plate, a guide-wall arising from the outer edge portion of said platform, and a lug projecting from said guide-wall toward said plate, in combination with a car-door and corner plate therefor, and a horizontal rib projecting forward from the same that is adapted to be engaged by the underside of said lug.

3. A support for car-doors comprising an attaching-plate having a vertical slot extending from the lower edge thereof, a tubular housing projecting from said plate in front of said slot, a bolt the head of which is confined and prevented from turning in said housing and whose barrel extends through said slot, a platform projecting from said plate above said housing, a guide-wall arising from the outer edge of said platform, and a lug projecting from said guide-wall toward said plate, in combination with a car-door and corner plate therefor, and a horizontal rib projecting forward from the same that is adapted to be engaged by the underside of said lug.

4. A support for car-doors comprising an attaching-plate, a platform projecting forward from said plate the central portion of which is cut away between its outer edge and said plate, a guide-wall which is integral with and a portion of which rises above the plane of the outer edge of the platform, a roller the journals of which have bearings in a lower extension of said guide-wall and in said plate, and a lug projecting inward from said guide-wall toward said plate, in combination with a car-door and corner plate therefor, and a horizontal rib projecting forward from the same that is adapted to be engaged by the underside of said lug.

5. A support for car-doors comprising an attaching-plate having a vertical slot in the lower edge thereof, a vertically elongated tubular housing projecting therefrom in front of said slot, a platform projecting forward from said plate the central portion of which is cut away between its outer edge and said plate, a guide-wall which is integral with and a portion of which rises above the plane of the outer edge of the platform, a roller the journals of which have bearings in a lower extension of said guide-wall and in said plate, and a lug projecting inward from said guide-wall toward said plate, in combination with a car-door and corner plate therefor, and a horizontal rib projecting forward from the same that is adapted to be engaged by the underside of said lug.

In witness whereof, I have hereunto set my hand this 15th day of February, 1915.

FRED MATHEWS.

Witnesses:
FRANK D. THOMASON,
FLORENCE MITCHELL.

Copies of this patent may be obtained for five cents each, by addressing the "Commissioner of Patents, Washington, D. C."